Patented Apr. 2, 1935

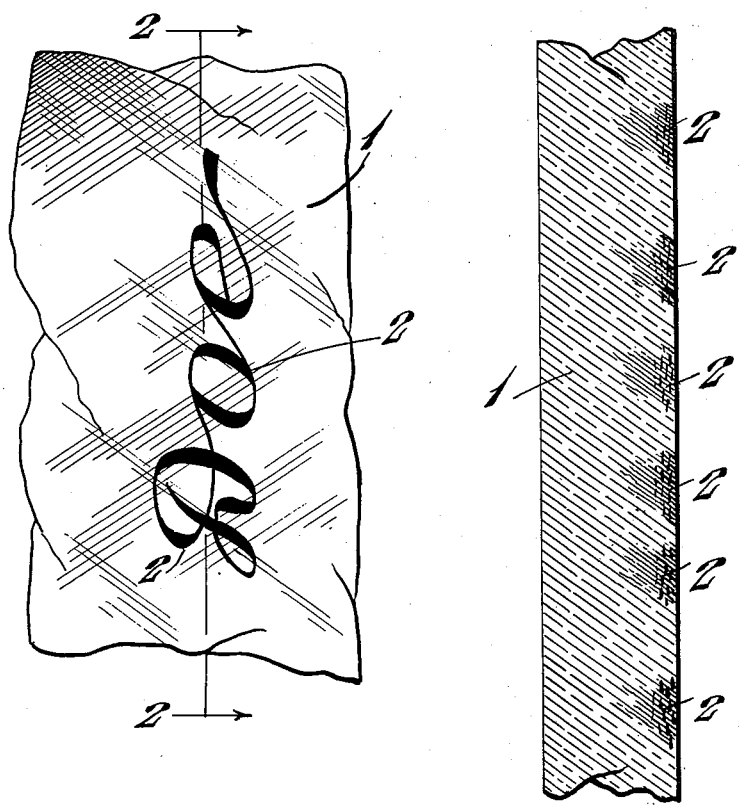

1,996,549

UNITED STATES PATENT OFFICE 1,996,549

DECALCOMANIA AND METHOD OF MAKING THE SAME

James F. McNutt, Youngstown, Ohio, assignor to The American Decal Corporation, Youngstown, Ohio, a corporation of Ohio Application November 30, 1934, Serial No. 755,317

REISSUED

4 Claims. (Cl. 41—33)

My invention relates to a new and useful decalcomania and method of making the same, and more particularly to a decalcomania especially adapted for use as a transfer to be applied to glassware generally, or other glazed or enameled surfaces, whereby the particular design appearing on the decalcomania may be transferred on to the glass, glazed or enameled surface and fused with or burned into such surface to become integral and flush therewith.

My invention still further relates to a decalcomania of this character, the design on which is printed with a specially prepared ink or pigment, which when applied to glass or a similar surface and heated to the proper extent will penetrate the surface of the glass and become permanently fused to and bonded with the body of the glass, the design being thus incorporated in the glass in sharp and clear outlines and being completely unremovable from the glass by either chemical or mechanical actions short of destroying the object thus ornamented.

In the accompanying drawing:

Fig. 1 represents a fragmentary front elevation of an object decorated by means of my novel decalcomania and according to my novel method.

Fig. 2 is a cross section, on a greatly enlarged scale, illustrating the penetration of the design into and its integration with the body of the bottle.

The carrying out of my invention and its practical application involves, generally speaking, three steps:

1. The preparation of the pigment to be used.
2. The preparation of the decalcomania.
3. The application of the decalcomania to the object to be decorated.

The preparation of the pigment to be used

Since it is necessary in the interests of permanent adhesion and in order thoroughly to integrate the color of the design to be produced with the object to which it is to be applied, I have found it necessary to develop a pigment or "ink" which is composed of a suitable vehicle, the desired colors or combination of colors, and a vitrifiable base, that is one which is adapted to fuse into and be incorporated with the body of the object to be decorated, carrying the pigment with it, thus permanently fixing the pigmented design in one or more colors on the surface of the object to be decorated. One example of the ingredients and approximate proportions that may be advisably used to produce an "ink" having the desired characteristics is as follows:

Approximately 11 ozs. of opaque or translucent varnish;

Approximately 3 ozs. of color or combination of colors;

Approximately 1 oz. of finely pulverized glass or other silicon base material having a fusing point not higher than but preferably slightly under the fusing point of the glass object to be decorated;

Approximately 1 oz. of any suitable drier.

The foregoing ingredients are thoroughly admixed to produce a homogeneous mass of a uniform consistency.

The preparation of the decalcomania

The decalcomania or transfer used in my invention preferably consists of a backing of any suitable inexpensive sheet material, such as paper or the like, which is coated on one side with a film of collodion or similar foundation. The design to be produced is then printed in any suitable manner on the collodion film, and while the design is still wet an additional charge of the dry color or combination of colors used in the preparation of the "ink" is blown or brushed on to the decalcomania or otherwise added to the original impression, thereby increasing the clearness, solidity and uniformity of the impression produced and insuring the appearance of distinct and clear outlines of the design after it is applied to the object to be decorated.

The application of the decalcomania to the object to be decorated

The decalcomania thus prepared is then soaked in water in order to soften the decalcomania and facilitate its application and pressing to and against the object to be decorated and generally to facilitate handling. With the decalcomania thus applied to the surface of the object to be decorated, such as a bottle, or the like, the paper backing may be removed from the collodion or may be left there, as desired. The bottle with the decalcomania applied thereto is then placed in a kiln or other retort which is suitably heated to raise the temperature to about 1100 degrees F., at which temperature the silicon or glass base of the ink fuses into and becomes integrated with the body of the object to be decorated and carries with it the color used in the preparation of the "ink", the backing of paper, if the same has not been removed, together with the collodion base, being completely burned out while the object being decorated is being subjected to heat. When the object being decorated is removed from the kiln it will be found that the color of the design originally printed on the decalcomania has become thoroughly integrated with and incorporated into the body of the object in an unremovable manner.

In the accompanying drawing I have attempted to illustrate the invention diagrammatically by showing a fragmentary piece of glass 1 on which the name "Doe" has been applied according to my process in any desired color or combination of colors. In Fig. 2, which is a greatly exaggerated cross sectional view, I have illustrated the manner in which the "ink" of which the letters "Doe" are formed penetrates into the glass 1 as shown at 2 in Fig. 2. In this way the color or colors with which letters are printed thus penetrate the body of the glass object 1 and become thoroughly and permanently integrated therewith, it being impossible to remove the letters thus applied by any means whatsoever without destroying the identity of the object 1. Furthermore, the "ink" of my invention has been found in practice to fuse at about 1100 degrees and thoroughly to merge with the body of the glass to which it is applied, thus making it possible to apply the same to an unlimited variety of glass or glazed surfaces which generally do not melt at 1500 degrees F. It will further be seen that by my novel method I produce an inexpensive "ink" which can be printed in any repeating or nonrepeating design or inscription upon separate decalcomanias, or a continuous sheet thereof, which decalcomania when applied to a glass object in the manner above set forth indelibly and unremovably incorporates the design printed thereon into the body of the glass.

I claim:

1. The method of permanently affixing a design to an object made of glass or the like which consists in printing a desired design on a decalcomania with a vitrifiable ink, applying the decalcomania to the surface of the object to be decorated, and subjecting said object to heat at approximately 1100 degrees F., whereby said vitrifiable ink is fused into and incorporated with the body of said object.

2. The method of permanently affixing a design to an object made of glass or the like which consists in printing the design on a decalcomania with an ink having a fusing point lower than the fusing point of the object to be decorated, applying said decalcomania to the surface of said object, and subjecting said object to heat sufficient to effect a fusing of said vitrifiable ink with the body of said object.

3. A decalcomania for transferring a design onto a glass object or the like comprising a base having the design printed thereon, said design being formed of vitrifiable material including as one of its components a pulverized glass of a fusing point slightly lower than the fusing point of the glass surface to be decorated.

4. A decalcomania for transferring a design onto a glass object or the like comprising a base having the design printed thereon, said design being formed of vitrifiable material including as one of its components a pulverized glass having a fusing point of about 1100° F.

JAMES F. McNUTT.